(12) United States Patent
Tan et al.

(10) Patent No.: US 12,542,446 B2
(45) Date of Patent: Feb. 3, 2026

(54) CHARGING SYSTEM AND THE RELATED CHARGING METHOD

(71) Applicant: PHIHONG TECHNOLOGY CO., LTD., Taoyuan (TW)

(72) Inventors: Yan-Keng Tan, Taoyuan (TW); Mu-Hsun Chen, Taoyuan (TW); Chen-Chan Lin, Taoyuan (TW); Chia-Hao Liu, Taoyuan (TW); Ming-Jyun Li, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 996 days.

(21) Appl. No.: 17/695,454

(22) Filed: Mar. 15, 2022

(65) Prior Publication Data

US 2022/0302718 A1 Sep. 22, 2022

(30) Foreign Application Priority Data

Mar. 22, 2021 (TW) .................................. 110110238

(51) Int. Cl.
*H02J 7/00* (2006.01)
*H02J 7/06* (2006.01)

(52) U.S. Cl.
CPC .......... *H02J 7/0029* (2013.01); *H02J 7/0048* (2020.01); *H02J 7/06* (2013.01); *H02J 7/00714* (2020.01); *H02J 7/007182* (2020.01)

(58) Field of Classification Search
CPC ..................................................... H02J 7/0029

USPC .......................................................... 320/162
See application file for complete search history.

(56) References Cited

U.S. PATENT DOCUMENTS

| | | | |
|---|---|---|---|
| 2013/0050890 A1* | 2/2013 | Rozman ............... | H03K 17/082 361/90 |
| 2016/0126766 A1* | 5/2016 | Zhang ...................... | H02J 7/00 320/116 |
| 2017/0133837 A1* | 5/2017 | Hasan .................... | H02H 9/001 |

FOREIGN PATENT DOCUMENTS

EP 2568569 * 3/2013

* cited by examiner

*Primary Examiner* — Yalkew Fantu
(74) *Attorney, Agent, or Firm* — MUNCY, GEISSLER, OLDS & LOWE, P.C.

(57) ABSTRACT

The present invention is proposed to improve a conventional two-pin charging device (dumb charger), which stops charging when the battery is fully charged and can avoid the inrush current at any charging stage. A novel intelligent securely charging system is proposed, which includes a control module for controlling the operation of the system, a power conversion module for converting the input AC power $AC_{in}$ into the electricity required by the system, a switch module for passing or interrupting electrical power transformation, and a pre-charging module with impedance higher than the switch module used for limiting the inrush current, and a voltage detection module which detects the battery voltage $V_b$, the charging voltage $V_a$. Further, the pre-charging module maintains in the on-state at any charging stage, and the switching module is configured to be in the on-state or off-state according to the application of the charging stage.

18 Claims, 6 Drawing Sheets

CHARGING SYSTEM AND THE RELATED CHARGING METHOD

TECHNICAL FIELD

The present invention relates to a securely intelligent charging system and its related charging method, and more particularly, relates to a method of preventing the battery from inrush current damage by improving the charging procedure and conditions.

BACKGROUND

Electronic equipments, such as smart phones, tablet computers, wearable electronic devices, or other electromechanical devices such as electric scooters, electric bicycles, etc., each of them is generally equipped with at least an internal rechargeable battery. Due to the limited internal space of these electronic devices or electromechanical devices that can accommodate batteries and the limited capacity of the battery modules in these devices, a charging device is needed to charge the battery modules of these devices to make sure these portable electronic devices or electromechanical devices can be safely charged.

However, because two-pin (2-Pin) charging devices currently sold on the market are lacked of a third pin for providing an additional signal communication channel as a feedback path between the electronic devices and their charging device, the charging devices must maintain outputting voltage all the time (similar to regular floating charging) to assure that the battery can be charged after being connected. However, this method can cause inrush current be fed into the battery due to huge voltage difference between the charging device and the battery, resulting sparks and splashes produced at the joint of the electronic device and the charging device, or even happened at the internal electronic circuit of the electronic device. In such cases, the electronic device would be damaged and the risk of accidents will increase.

Please refer to FIG. 1, it shows various charging stages of the traditional 2-Pin charging device, including an initial charging stage, a constant current charging stage (CC), a constant voltage charging stage (CV), and a charging completion stage. In FIG. 1, it can be seen that at the beginning of the charging process, a 2-Pin charging device with charging voltage $V_0$ is connected to the battery at t1. The charging voltage of the 2-Pin charging device needs to raise to a default value $V_0$ before the charging current $I_0$ start to charge, but at this moment the charging current $I_0$ would have a discontinuous variation to form an inrush current. In addition, the output of charging current $I_0$ in the traditional 2-Pin charging device could not be cut off when the battery near to the charging completion stage, as aforementioned, the traditional 2-Pin charging device is unable to provide an additional signal channel as a feedback path because it lacks the third Pin. The charging voltage must maintain in outputting status, it is unlikely to cut off the charging current even at the stage of nearly charging completion, therefore a tail's current is formed as shown in FIG. 1.

However, the above charging method for traditional 2-Pin charging device has the following disadvantages:

First of all, it may cause violent electrochemical reaction in the battery and can result rapidly rising of battery temperature due to large charging current (inrush current) being fed into the battery when the battery is at low voltage in the initial charging stage. This situation will reduce the battery's life time and increase the possibility of accidental risks, for example fire disaster, explosion, etc. Secondly, at the initial charging stage of the conventional 2-Pin charging device, the battery of the electronic device to be charged is at a low voltage condition, the input current of the conventional 2-Pin charging device is controlled through a current-limiting resistor, the voltage across the current-limiting resistor will vary with the battery voltage, therefore, the charging current will be quite large at the beginning, the voltage will rise during the charging process, and this can cause the pre-charging current varied greatly. Accordingly, the conventional 2-Pin charging device lacks the corresponding mechanism to deal with the above situations. In addition, because the current-limiting resistor must be able to withstand high power dissipation, a resistor with a higher electrical specification is required, and the heat loss is increased, thereby causing poor power conversion efficiency and is not conductive to the design of miniaturized chargers.

Lastly, the third disadvantage is related to the continuous charging of the battery. Although in the current state of art, most of the batteries of electronic devices or electromechanical devices may have equipped with additional charging protection circuits to confine the charging current in a safe range, or to cut off charging when the battery is fully charged to avoid accidents from happening. However, based on the statistics of the past reports, it is quite risky to solely rely on the charging protection circuit provided by the third-party manufacturer installed in the electronic device, if the manufacturer skips the charging protection circuit installation under the cost consideration, or the electronic device itself suffers unexpected defects in the battery architecture (such as the spontaneous combustion of the Galaxy Note 7's battery in 2017), it will still expose the battery to possible safety risks.

Therefore, due to the disadvantages of traditional 2-Pin charging devices, especially the large variation in the charging current at the beginning of the charging process, it is not conducive to the miniaturization, safety, charging efficiency and battery lifetime of the charging device. In addition, the charging current can't be cut off after the charging is completed. Therefore, further improvement of the existing 2-Pin charging device and its related charging methods are required.

SUMMARY OF THE INVENTION

For the aforementioned purpose, the present invention proposes a novel securely intelligent charging system, which includes a power conversion module providing electricity required to operate the charging system, a switching module coupled to the power conversion module and at least one control module, and controlled by at least one control module to pass or interrupt electrical power transformation from the power conversion module, a pre-charging module, having a higher impedance compared to the switching module, coupled to the power conversion module and the at least one control module, and controlled by the at least one control module to limit inrush current, and a voltage detection module, coupled between the power conversion module and a battery, used for detecting battery voltage $V_b$ and charging voltage $V_a$, and feeding them into the at least one control module, wherein the pre-charging module is under on-state, and the switching module is under off-state while the battery is under a pre-charging stage or under a charging completion stage.

In one preferred embodiment, charging current $I_a$ is cut off when the battery is under the charging completion stage.

In one preferred embodiment, the pre-charging module is under the off-state, and the switch module is under the on-state while the battery is under a constant voltage charging stage or under a constant current charging stage.

In one preferred embodiment, the charging system further comprises a feedback module and a current detection module.

In one preferred embodiment, the current detection module is coupled to the at least one control module and the feedback module and the battery, and is arranged to detect battery current $I_b$, to feed it into the at least one control module as well as the feedback module.

In one preferred embodiment, the feedback module is coupled to the power conversion module, the at least one control module, the voltage detection module, and the current detection module, and is arranged to receive signals from the at least one control module, the voltage detection module and the current detection module, to process them, and then output control signals to the power conversion module to adjust electrical power output of the power conversion module.

In one preferred embodiment, the structure of the charging system is applied to a 2-Pin charging device.

In one preferred embodiment, a feedback loop is formed between the battery and the power conversion module, and is controlled by the at least one control module for stabilizing the charging voltage $V_a$ during each charging stage, based on the battery voltage $V_b$ and battery current $I_b$ detected at individual charging stage.

In one preferred embodiment, the at least one control module includes a processor, a microprocessor, a micro control unit (MCU), or the like.

For the aforementioned purpose, the present invention proposes a charging method applied to a 2-Pin charging device used for charging a battery, which includes steps of determining which charging stage should be performed according to battery voltage $V_b$ detected by a voltage detection module, then transferring detection results into a control module, setting a pre-charging module being under on-state and a switching module being under off-state when the battery voltage $V_b$ detected is under pre-charging range, setting the 2-Pin charging device being under charging completion stage and measuring the battery voltage $V_b$ again when charging current of the 2-Pin charging device is reduced to a default value, and maintaining the pre-charging module under the on-state, and the switching module under the off-state when the battery is continuously connected, re-connected, or disconnected to the 2-Pin charging device.

In one preferred embodiment, the charging current $I_a$ is cut off when the battery is under the charging completion stage.

In one preferred embodiment, the pre-charging module is under the off-state, and the switch module is under the on-state while the battery is under constant current charging stage.

In one preferred embodiment, the charging current $I_a$ is constant while the battery is under constant current charging stage.

In one preferred embodiment, the pre-charging module is under the off-state, and the switch module is under the on-state while the battery is under the constant voltage charging stage.

In one preferred embodiment, the charging voltage $V_a$ is constant while the battery is under the constant voltage charging stage.

In one preferred embodiment, the control module, the voltage detection module, the pre-charging module, and the switching module are arranged in the 2-Pin charging device for performing charging process to the battery.

In one preferred embodiment, the switching module is coupled to a power conversion module and the control module to pass or interrupt electrical power transformation from the power conversion module, the pre-charging module is coupled between the power conversion module and the battery to limit inrush current, and the voltage detection module is coupled between the power conversion module and the battery for detecting battery voltage $V_b$ and charging voltage $V_a$, and feeding them into the control module.

In one preferred embodiment, the power conversion module provides electricity required to operate charging process.

In one preferred embodiment, the pre-charging module is coupled to the control module and the pre-charging module being in the on-state or the off-state is controlled by the control module.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Figure 1:
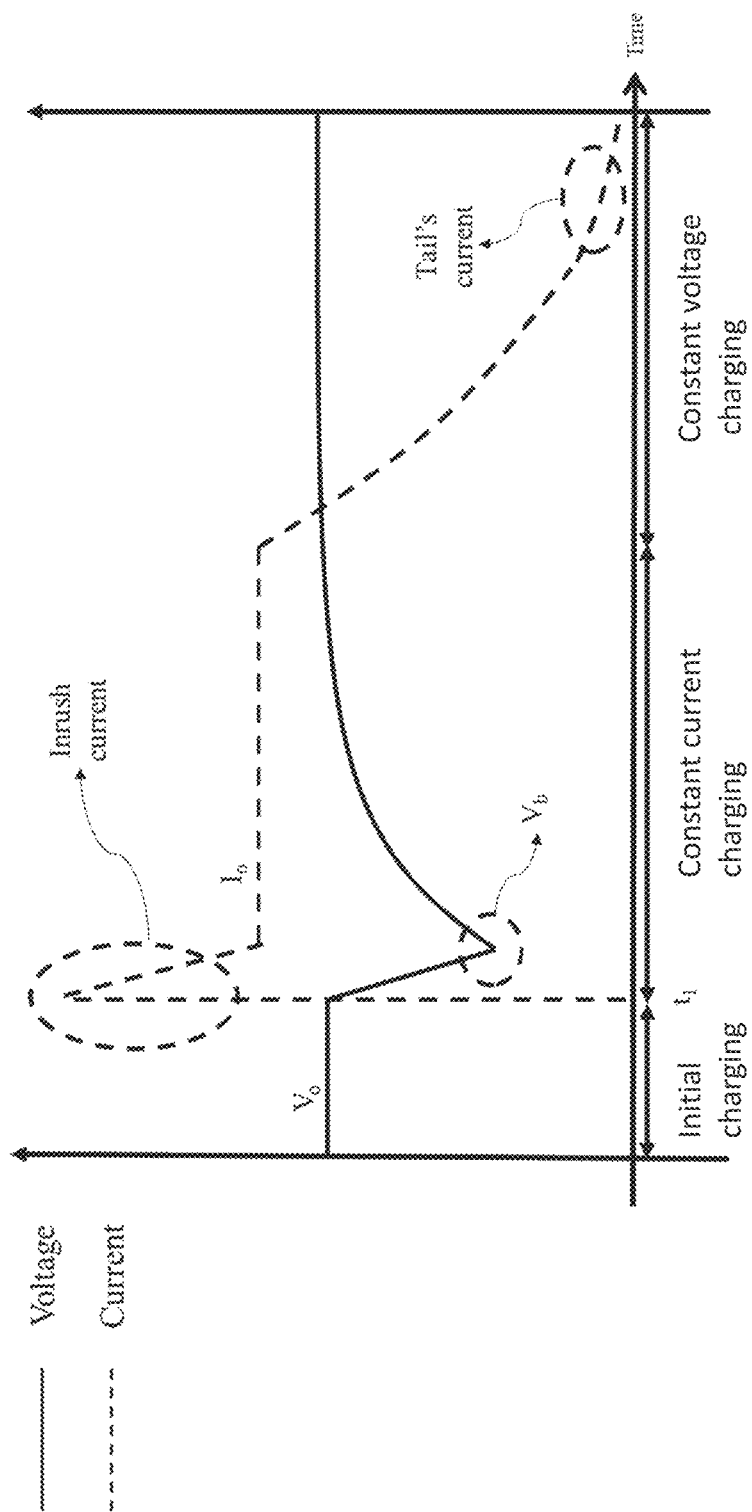
FIG. 1 illustrates the charging curve of a traditional 2-Pin charging device at various charging stages according to a prior art.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention proposes a securely intelligent charging system and its related charging method to improve the drawbacks of traditional 2-Pin charging device mentioned in background section. One aspect of the present invention is to reduce the inrush current at the initial charging stage caused by having large amount of charging current for preventing violent electrochemical reaction of the battery and rapid rise of battery's temperature. Another aspect of the present invention is to solve the energy dissipation issue caused by large voltage variation of the current-limiting resistor due to initially low battery voltage, which can improve low power conversion efficiency issue. Finally, the present invention is proposed to secure the electricity safety to eliminate the over-charging issue due to lacking protection circuit.

Accordingly, the goal of the present invention is to improve charging procedure of a 2-Pin charging device for achieving the same charging effect of a 3-Pin charging device, the details are illustrated as follows. Please refer to FIG. 2, a securely intelligent charging system 100 is provided according to one preferred embodiment of the present invention, it includes a control module 101 provided for controlling the operation of the system, a power conversion module 103 is used for converting the input AC power (ACin) into the electricity (DC power) required by the system, a switching module 117 coupled between the power conversion module 103 and a battery 111, which is also coupled to the control module 101 and controlled by the control module 101 for passing or interrupting electrical power transformation from the power conversion module 103 to a battery 111, a pre-charging module 105 having a higher impedance compared to the switching module 117 coupled between the power conversion module 103 and the battery 111, which is also coupled to the control module 101 and controlled by the control module 101 for limiting the inrush current been fed into the battery 111, and a voltage detection module 107 is configured to detect the battery voltage $V_b$ and charging voltage $V_a$ of the power conversion module 103 and to feed them into the control module 101. The voltage detection module 107 is coupled to the power conversion module 103, the control module 101 and the battery 111. The pre-charging module 105 is under on-state, and the switching module 117 is under off-state while the battery 111 is under the pre-charging or charging completion stages. It should be emphasized that solid arrows indicate signal flow while dashed arrows indicate power flow. In one embodiment, the control module 101 can be a processor, a microprocessor, a micro control unit (MCU), or the like.

Figures 3A, 3B:
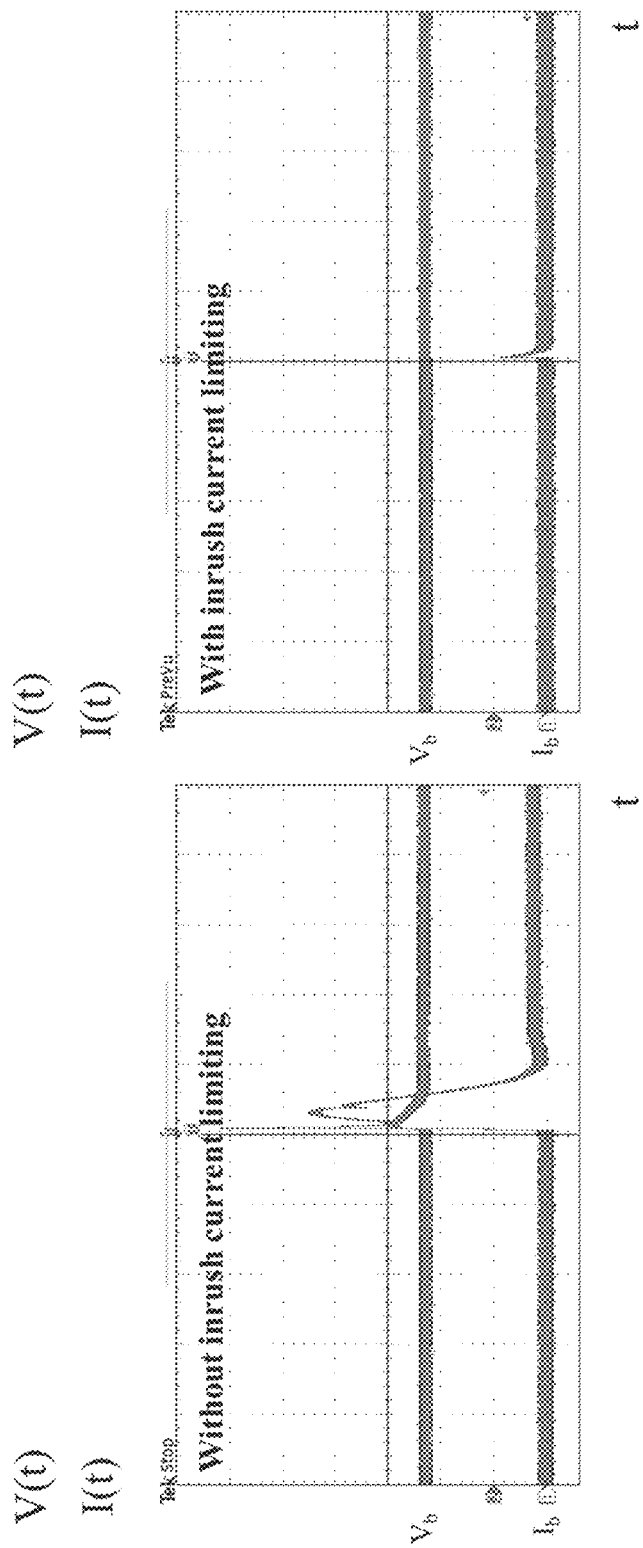
FIG. 3(A) illustrates a charging curve when the battery connected to a traditional 2-Pin charging device without inrush-current-limiting device according to a preferred embodiment of the present invention.
FIG. 3(B) illustrates a charging curve when the battery connected to a traditional 2-Pin charging device with inrush-current-limiting device according to a preferred embodiment of the present invention.

According to one aspect of the present invention, the values of charging voltage $V_a$ and charging current $I_a$ provided by the securely intelligent charging system 100 at various charging stages (i.e. pre-charging, constant current, constant voltage, and charging completion) are controlled through the value of battery voltage $V_b$ detected by the voltage detection module 107, also based on the conduction/non-conduction state of the pre-charging module 105 and the switching module 117. Please refer to FIG. 3(A) and FIG. 3(B), in one embodiment of the present invention, the impedance of the pre-charging module 105 is relatively higher than the switching module 117. The phenomenon of producing sparks in the joint of the charging device can be removed based on the high impedance characteristics of the pre-charging module 105, which can be achieved by setting the pre-charging module 105 under the on-state, and meanwhile, the switching module 117 under the off-state to limit or confine the generation of inrush current when the battery 111 in pre-charging stage. FIG. 3(A) and FIG. 3(B) show the comparison between a 2-Pin charging device with or without the pre-charging module 105. It is quite obvious that the charging current $I_a$ raises to an extremely high level at an instant time interval while the battery 111 is connected to charging device without the pre-charging module 105 (FIG. 3(A)). On the other hand, the charging current $I_a$ (inrush current) can be significantly restrained if the pre-charging module 105 is introduced to the 2-Pin charging device, which improves the electricity safety of the charging device according to the experimental data shown in FIG. 3(A) and FIG. 3(B).

Figure 2:
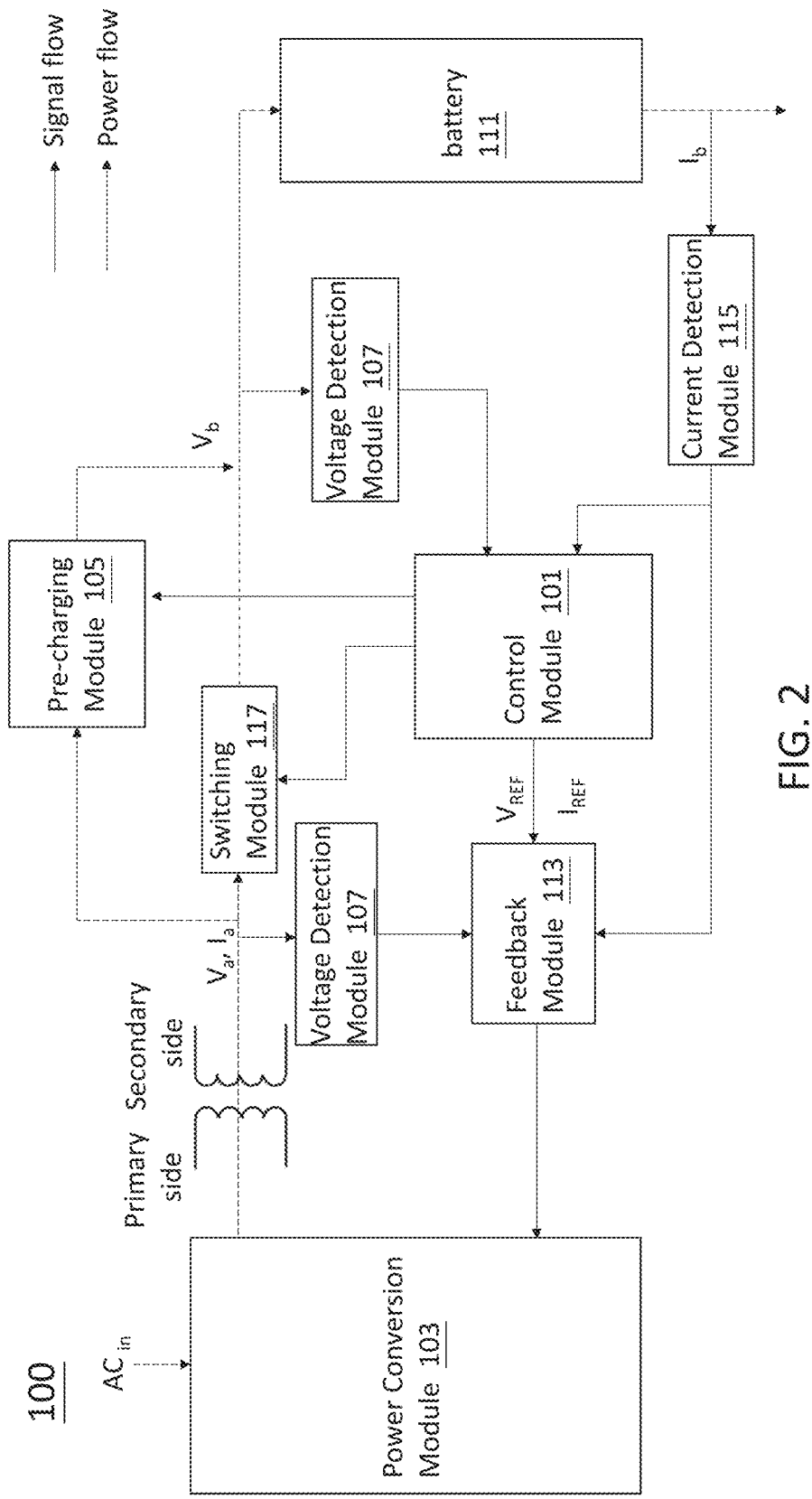
FIG. 2 illustrates a system architecture of the intelligent securely charging system according to a preferred embodiment of the present invention.
Figure 4:
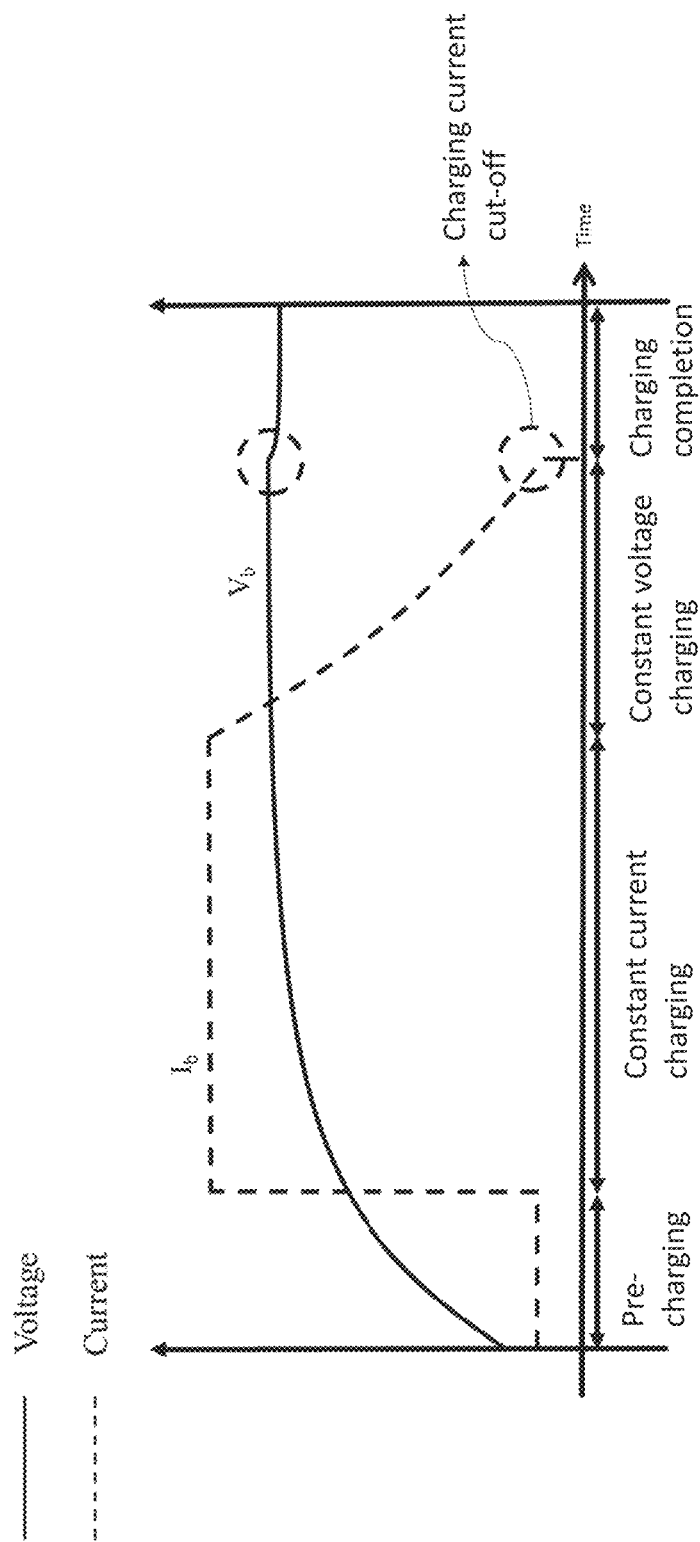
FIG. 4 illustrates the charging curve of the proposed securely intelligent charging system and method at various stages of charging process according to a preferred embodiment of the present invention.

Similarly, please refer to both FIG. 2 and FIG. 4, the control module 101 determines the pre-charging module 105 being in the on-state and the switching module 117 being in the off-state at the charging completion stage. As aforementioned, when the battery 111 is near to the fully charged stage, the battery voltage $V_b$ would reach to a maximum value, making the voltage difference across the switching module 117 gradually decrease. Accordingly, the switching module 117 is switched to the off-state by the control module 101 based on the voltage difference across the switch module 117. In addition, owing to the high impedance of the pre-charging module 105, the charging current $I_a$ of 2-Pin charging device could naturally be cut off to achieve the same effect obtained by the 3-Pin charging device.

In accordance with one content of the present invention, as illustrated in FIG. 2, the securely intelligent charging system 100 further includes a feedback module 113 and a current detection module 115. The current detection module 115 is coupled to the control module 101, the feedback module 113 and the battery 111, and arranged to detect the battery current $I_b$ and feed it into the control module 101 as well as the feedback module 113. The feedback module 113 is coupled to the control module 101, the voltage detection module 107, the current detection module 115 and the power conversion module 103, and is arranged to receive signals from the control module 101, the voltage detection module 107 and the current detection module 115, to process them, and then output control signals to adjust electrical power output of the power conversion module 103. A feedback loop is formed between the battery 111 and the power conversion module 103, and controlled by the control module 101 for stabilizing the charging voltage $V_a$ and $I_a$ during each charging stage, which allows the control module 101 to adjust the output charging voltage $V_a$ and charging current $I_a$ based on the detected battery voltage $V_b$ and battery current $I_b$ at individual charging stage. Therefore, the charging voltage $V_a$ applied to the battery 111 can stay stable and prevent it from violent variations causing by the electricity disturbance of the power conversion module 103, which could extend the battery's lifetime and improve charging efficiency. In another embodiment of the present invention, the control module 101 would output a voltage reference signal $V_{REF}$ and a current reference signal $I_{REF}$ as the reference signals based on the detected parameters, such as $V_b$ and $I_b$ at various charging stages, the control module 101 outputs reference signals $V_{REF}$ and $I_{REF}$ as input reference signals of the feedback module 113 for loop feedback compensation. Each input reference signal is subtracted from the actual signal to get an error signal, where the actual battery voltage $V_b$ (battery current $I_b$) output is detected by the voltage detection module 117 (current detection module 115), and then the error signal is used to adjust a control signal for adjusting the DC output value, i.e. $I_a$ and $V_a$, of the power conversion module 103. Accordingly, a person in the art should realize that voltage reference signal $V_{REF}$ and a current reference signal $I_{REF}$ outputted by the control module 101 would include the reference value of each stage such as the pre-charging stage, constant current charging stage, constant voltage charging stage, and charging completion stage, so that the securely intelligent charging system 100 could adjust the charging voltage $V_a$ and the charging current $I_a$ according to the battery 111 status at any stage for protecting the battery 111, electronic device or electromechanical device.

Figure 5:
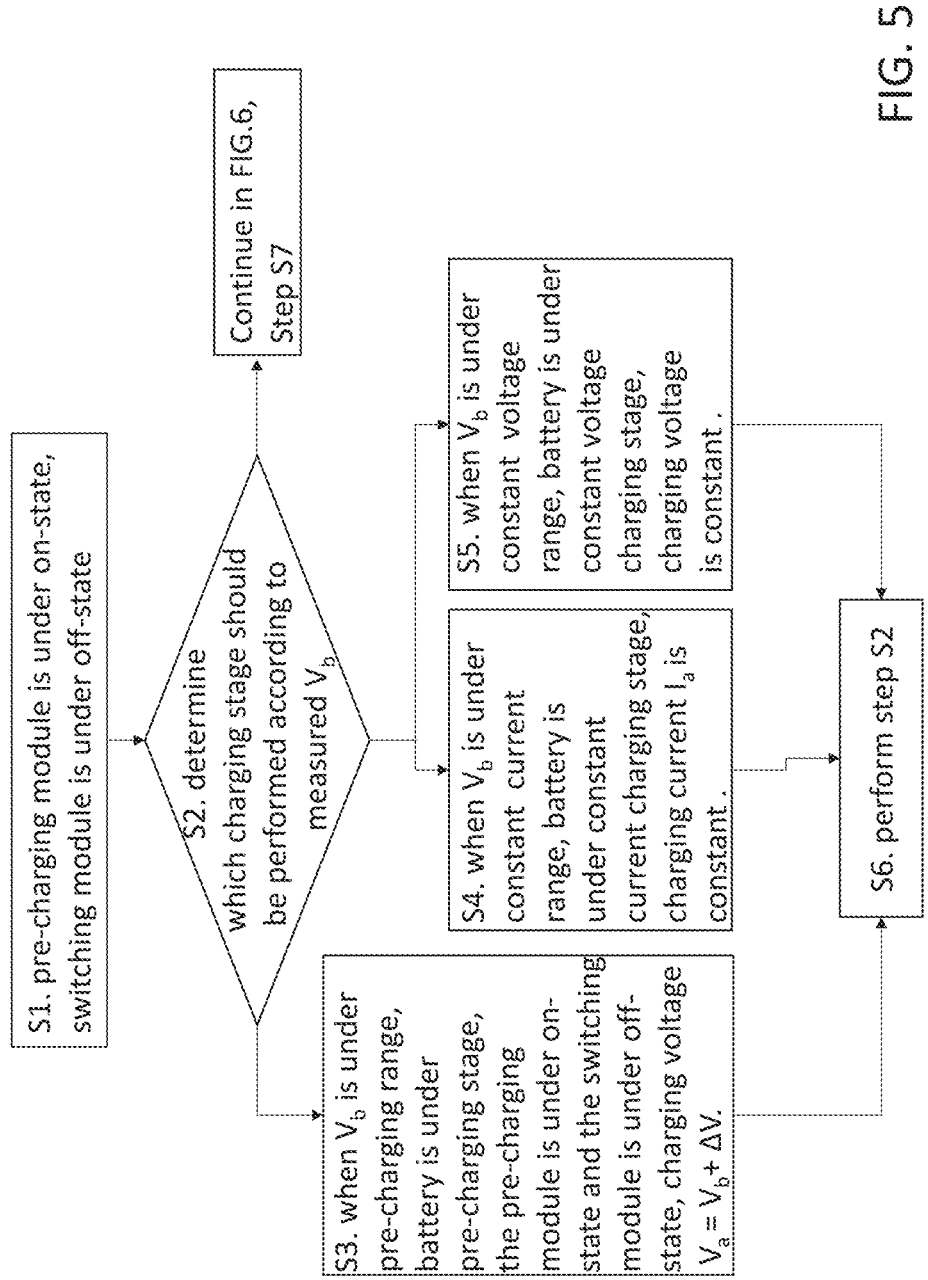
FIG. 5 illustrates detailed steps for explaining a proposed securely intelligent charging method according to a preferred embodiment of the present invention.
Figure 6:
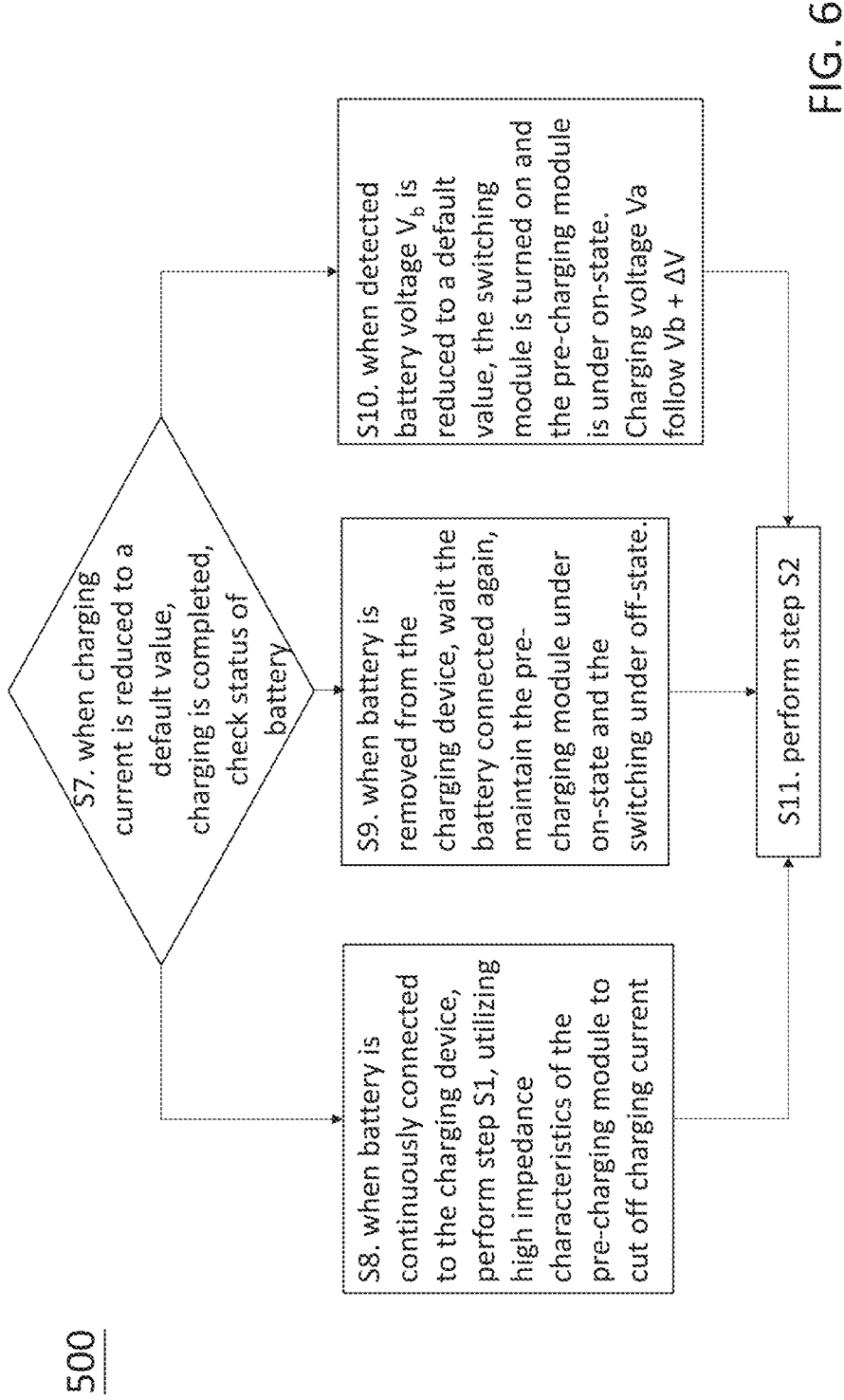
FIG. 6 illustrates detailed steps for explaining a proposed securely intelligent charging method according to a preferred embodiment of the present invention.

Furthermore, in a preferred embodiment of the present invention, the control module 101 is a microcontroller (Micro Control Unit, MCU) which integrates with central processing unit, memory, timer/counter, and various input and output interfaces to provide logic operation and to coordinate computational resources for performing the charging procedure of the securely intelligent charging system 100. In the view of the present invention, the securely intelligent charging system 100 comprises at least one control module 101, namely, the system may include a plurality of microcontrollers, so that the control module 101 could provide integrated control of various components in the system according to various applications. In the embodiment of the present invention, each component of the securely intelligent charging system 100 could execute instructions by individual control unit at the same time, increasing overall speed of program execution that support parallel computation. For example, in one embodiment of the present invention, an integrated control module 101 can be used to control the operation of the entire securely intelligent charging system 100, and a specific of component, such as the feedback module 113 could have its own logic operation units for further enhancement of the corresponding functionality. Similarly, it should be recognized that the preferred embodiments of the present invention are provided only for illustration purpose rather than limiting the present invention, the person in the art could understand that the remaining system components may also include an independent microcontroller for the needs of the application To improve the functionality of the traditional charging device, please refer to the FIG. 5, FIG. 6 together with FIG. 2, the present invention provides an securely intelligent charging method 500 applied to a 2-Pin charging device. The method includes the following steps: initially, the securely intelligent charging system 100 starting from an initial stage (waiting status), i.e. in step S1, where the pre-charging module 105 is under on-state and the switching module 117 is under off-state; in step S2, determining which charging stage should be performed by measuring the battery voltage $V_b$ and transmitting the detection result into the control module 101; in step S3, when the value of $V_b$ is under the pre-charging range (a predetermined voltage value range), the control module 101 justifies that the battery 111 is under the pre-charging stage, at this stage the control module 101 can control and configure the pre-charging module 105 into on-state and the switch module 117 into off-state, the charging voltage $V_a$ is expressed as $V_a=V_b+\Delta V$, where $\Delta V$ is the voltage difference between the charging voltage $V_a$ and the measured battery voltage $V_b$; in step S7, when the charging current $I_a$ is reduced to a default value, the 2-Pin charging device is then stopping to transmit electricity to the battery 111, the 2-Pin charging device is under the charging completion stage and need to check the status of the battery 111; in step S8, when the battery 111 is continuously connected to the 2-Pin charging device, the 2-Pin charging device maintains the pre-charging module 105 under on-state, the switch module 117 under off-state, i.e. to perform step S1. It should be noticed that the voltage difference $\Delta V$ could be coordinated by the control module 101 according to the detected battery voltage $V_b$ being under the pre-charging stage, constant current stage, constant voltage stage, or charging completion stage.

Continuing from the above description, various setting of $\Delta V$ can be realized as follows. For example, if the detected battery voltage $V_b$ is 10V, which is far from its fully charged voltage, during the pre-charging stage, $\Delta V$ can be preset to be 10V, the magnitude of the charging voltage $V_a$=10V+10V=20V. In another example, if the battery voltage $V_b$ is 35V, during the constant current charging stage, $\Delta V$ can be preset to be 1V, the charging voltage $V_a$=35V+1V=36V is slightly higher than the battery voltage $V_b$, the voltage difference between the two ends of the switching module 117 won't be too large. In the present invention, to achieve the purpose of effectively suppressing the surge current, the charging voltage $V_a$ and the charging current $I_a$ can be effectively controlled in each charging stage by controlling the preset output voltage $\Delta V$ through the control module 101. Among them, it should be noted that the values of $\Delta V$, battery voltage $V_b$, charging voltage $V_a$, charging current $I_a$, etc. are only examples, and the aforementioned control method is not limited to the pre-charging stage and the constant current stage, which is well known in the art. It should be understood that they have been presented by a way of example and not limitation. Numerous modifications and variations within the scope of the invention are possible.

According to the content of the present invention, the securely intelligent charging method 500 further includes a step S9 after performing step S7. In step S9, when the battery 111 is removed from the 2-Pin charging device, the 2-Pin charging device waits the battery 111 connected again, maintains the pre-charging module 105 under the on-state and the switching module 117 under the off-state.

According to the content of the present invention, the intelligent securely charging method 500 further includes a step S10 after performing step S7. In step S10, when the detected battery voltage $V_b$ is reduced to a default value, the switching module 117 is turned into on-state and the pre-charging module 105 is also turned into the on-state. It should be recognized that a step S11 has to be executed after the completion of step S8, S9, or S10 for the electricity safety purpose, in step S11, the 2-Pin charging device re-measuring the battery voltage $V_b$, and determine which charging stage should be performed of the 2-Pin charging device according to battery voltage $V_b$.

According to one embodiment of the present invention, the intelligent securely charging method 500 further includes step S4 after performing step S2. In step S4, when the detected battery voltage $V_b$ is under the constant current range, the control module 101 sets up the 2-Pin charging device as the constant current charging stage to output a constant current and increase the speed of charging, where the switching module 117 is turned into on-state and the pre-charging module 105 is also turned into on-state. In one aspect of the present invention, due to the low impedance characteristic of the switching module 117, compared with the relative high impedance characteristic of the pre-charging module 105, it won't matter the 2-pin charging device be in constant current charging mode or in constant voltage charging mode, the charging current will not flow through pre-charging module 105, therefore there is no need to turn off the pre-charging module 105. In one aspect of the present invention, it should be noticed that the pre-charging module 105 can be maintained under a conducting state, i.e. on-state, at any charging stage due to its high impedance characteristics, unless the control module 101 detects abnormal conditions of charging parameters, such as the detected battery voltage $V_b$, detected battery current $I_a$, charging voltage $V_a$, charging current $I_a$, etc., or other abnormal conditions happened. Only such situations happened, the pre-charging module 105 need to be cut off for safety purpose. Since there is no need to specify on/off state of the pre-charging module 105 during normal charging situation, the control process can be simplified. In addition, because the impedance of the pre-charging module 105 is higher than that of the switching module 117, keeping the pre-charging module 105 in always on state can suppress the generation of inrush current by itself. Therefore, the specification of fuse for the 2-Pin charging device itself can be selected according to the normal electrical power supply range, the fuse with a lower cut-off current can be selected, and there is no need to choose a fuse with a higher cut-off current because of the surge current, which can further enhance the response ability of the 2-Pin charging device itself in abnormal situations during charging process.

In addition, according to another embodiment of the present invention, the pre-charging module 105 can still be set to be under cut-off state by the control module 101 in each charging process according to the needs of applications. In the cut-off state, for example, in step S4 or S5, when the charging device performs constant voltage charging or constant current charging, the pre-charging module 105 is set to be in cut-off state and the switch module 117 is set to be in conducting state during each charging stage, ensuring that no reverse current can be generated during charging process for safety reason.

In accordance with one embodiment of the present invention, the securely intelligent charging method 500 further includes a step S5 after performing step S2, in step S5, when the battery voltage $V_b$ gradually approaches to a fully charged state, the voltage difference between the two ends of the switching module 117 will gradually decrease as the detected battery voltage $V_b$ rises, and the charging current $I_a$ will naturally decrease, forming a constant voltage charging stage. After the voltage difference across the two ends of switch module 117 reach to a default value, it is determined that the charging is complete, performs step S2 to re-measure the battery voltage $V_b$. It should be emphasized that, for electricity safety reason, a step S6 (same as S2) should be performed after the completion of each step S3, S4, or S5. In step S6, the 2-Pin charging device re-measures the battery voltage $V_b$ and determines which charging stage should be performed of the 2-Pin charging device according to battery voltage $V_b$.

According to the content of the present invention, the securely intelligent charging method 500 further includes the step S1. In step S1, the control module 101 predetermines the pre-charging module 105 being in on-state and the switch module 117 being in off-state when the battery 111 is continuously connected, re-connected or disconnected with the 2-Pin charging device for avoiding the inrush current damage the battery 111.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A charging system comprising:
    a power conversion module providing electricity required to operate the charging system;
    a switching module coupled to the power conversion module and at least one control module, and controlled by the at least one control module to pass or interrupt electrical power transformation from the power conversion module;
    a pre-charging module, having a higher impedance compared to the switching module, coupled to the power conversion module and the at least one control module, and controlled by the at least one control module to limit inrush current;
    a voltage detection module, coupled between the power conversion module and a battery, used for detecting battery voltage $V_b$ and charging voltage $V_a$, and feeding them into the at least one control module;
    wherein the pre-charging module is under on-state, and the switching module is under off-state while the battery is under a pre-charging stage or under a charging completion stage; and
    wherein a feedback module is coupled to the power conversion module, the at least one control module, the voltage detection module and a current detection module, and is arranged to receive signals from the control module, the voltage detection module and the current detection module, to process the signals, and then output control signals to adjust electrical power output of the power conversion module.

2. The charging system of claim 1, wherein charging current $I_a$ is cut off when the battery is under the charging completion stage.

3. The charging system of claim 1, wherein the pre-charging module is under the off-state, and the switch module is under the on-state while the battery is under a constant voltage charging stage or under a constant current charging stage.

4. The charging system of claim 1, wherein the current detection module is coupled to the at least one control module, the feedback module and the battery, and is arranged to detect battery current $I_b$, to feed it into the at least one control module as well as the feedback module.

5. The charging system of claim 1, wherein the structure of the charging system is applied to a 2-Pin charging device.

6. The charging system of claim 1, wherein a feedback loop is formed between the battery and the power conversion module, and is controlled by the at least one control module for stabilizing the charging voltage $V_a$ during each charging stage, based on the battery voltage $V_b$ and the battery current $I_b$ detected at individual charging stage.

7. The charging system of claim 1, wherein the at least one control module includes a processor, a microprocessor, a micro control unit (MCU), or the like.

8. A charging method applied to a 2-Pin charging device used for charging a battery, comprising:
    determining which charging stage should be performed according to battery voltage $V_b$ detected by a voltage detection module, then transferring detection results into a control module;
    setting a pre-charging module being under on-state and a switching module being under off-state when the battery voltage $V_b$ detected is under pre-charging range;
    setting the 2-Pin charging device being under charging completion stage and measuring the battery voltage $V_b$ again when charging current $I_a$ of the 2-Pin charging device is reduced to a default value;
    maintaining the pre-charging module under the on-state, and the switching module under the off-state when the battery is continuously connected, re-connected, or disconnected to the 2-Pin charging device; and
    wherein a feedback module is coupled to a power conversion module, the control module, the voltage detection module and a current detection module, and is arranged to receive signals from the control module, the voltage detection module and the current detection module, to process the signals, and then output control signals to adjust electrical power output of the power conversion module.

9. The charging method of claim 8, wherein the charging current $I_a$ is cut off when the battery is under the charging completion stage.

10. The charging method of claim 8, wherein the pre-charging module is under the off-state, and the switch module is under the on-state while the battery is under constant current charging stage.

11. The charging method of claim 10, wherein the charging current $I_a$ is constant.

12. The charging method of claim 8, wherein the pre-charging module is under the off-state, and the switch module is under the on-state while the battery is under constant voltage charging stage.

13. The charging method of claim 8, wherein the pre-charging module is under the on-state, and the switch module is turned on while the battery voltage $V_b$ detected is reduced to a default value.

14. The charging method of claim 13, wherein the charging voltage $V_a$ is set to be following $V_b+\Delta V$, $\Delta V$ is voltage difference between the charging voltage $V_a$ and the battery voltage $V_b$ detected.

15. The charging method of claim 8, wherein the control module, the voltage detection module, the pre-charging module, and the switching module are arranged in the 2-Pin charging device for performing charging process to the battery.

16. The charging method of claim 15, wherein the switching module is coupled to the power conversion module and the control module to pass or interrupt electrical power transformation from the power conversion module, the pre-charging module is coupled between the power conversion module and the battery to limit inrush current, and the voltage detection module is coupled between the power conversion module and the battery for detecting battery voltage $V_b$ and charging voltage $V_a$, and feeding them into the control module.

17. The charging method of claim 16, wherein the power conversion module provides electricity required to operate the charging process.

18. The charging method of claim 16, wherein the pre-charging module is coupled to the control module and the pre-charging module being in the on-state or the off-state is controlled by the control module.

* * * * *